United States Patent [19]

Barnes, Jr. et al.

[11] 4,015,270
[45] Mar. 29, 1977

[54] SHOCK PROOF EVENT RECORDER

[75] Inventors: Vernon M. Barnes, Jr.; Norman E. Flournoy; Eugene B. Horton, Jr., all of Richmond, Va.

[73] Assignee: Texaco Inc., New York, N.Y.

[22] Filed: Oct. 1, 1975

[21] Appl. No.: 618,536

[52] U.S. Cl. .......................... 346/139 R; 74/99 R; 74/567

[51] Int. Cl.² .................................. G01D 5/04

[58] Field of Search ............. 346/139 R, 116, 117, 346/119, 120, 123, 128; 74/99 R, 99 A, 107, 104, 567

[56] References Cited
UNITED STATES PATENTS

| | | | |
|---|---|---|---|
| 559,394 | 5/1896 | Marix | 346/117 |
| 2,346,802 | 4/1944 | Walker | 346/62 |
| 2,515,658 | 7/1950 | Merkel | 346/49 |

*Primary Examiner*—Joseph W. Hartary
*Attorney, Agent, or Firm*—T. H. Whaley; C. G. Ries; Henry C. Dearborn

[57] ABSTRACT

A pivoted pointer or stylus is mounted for actuation by reciprocatory plunger action. It has a stop associated with the plunger to hold the stylus locked in a neutral position until the plunger is actuated. The stylus has a cam action surface for cooperating with another part of the stop after the stop has moved to release the stylus. The cam action causes pivotal movement of the stylus to indicate an event.

9 Claims, 5 Drawing Figures

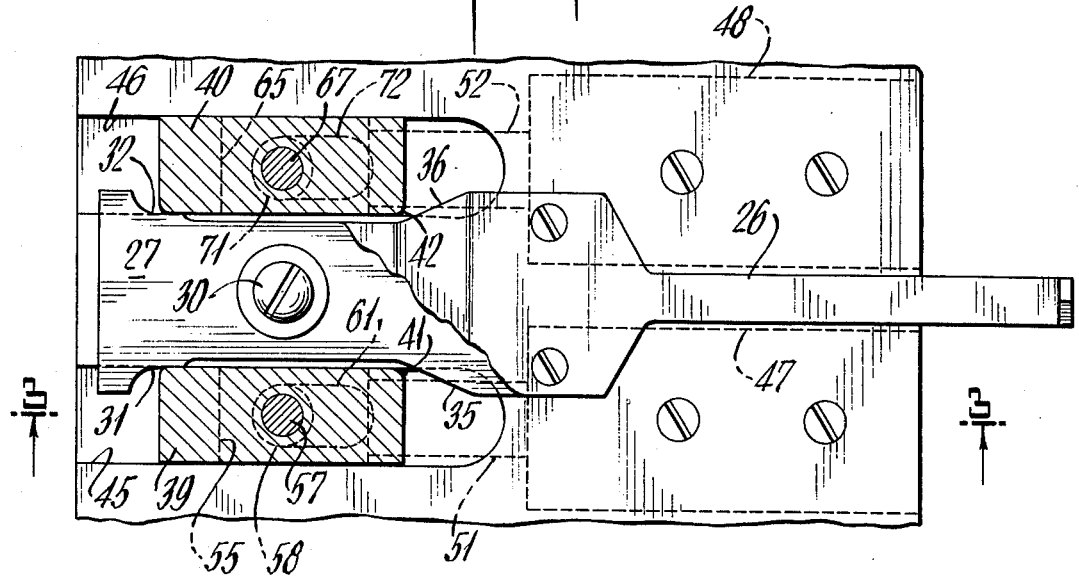
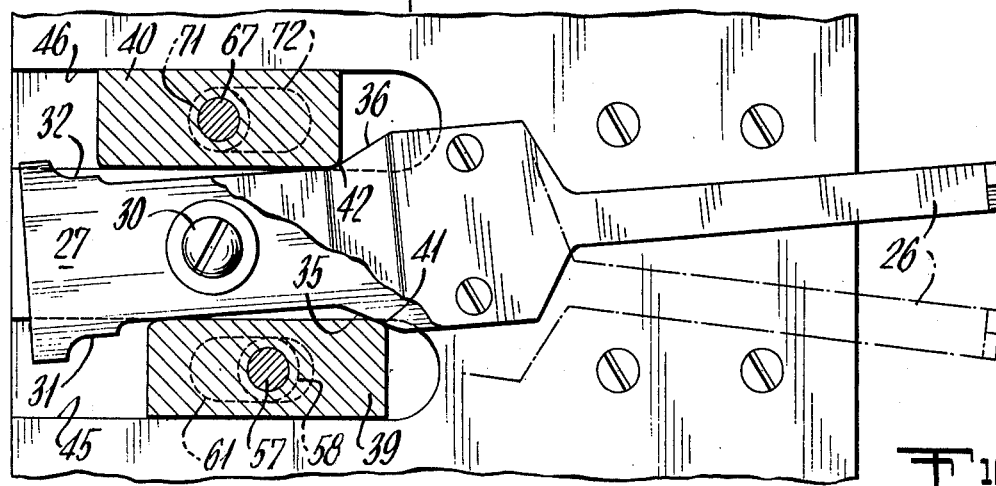
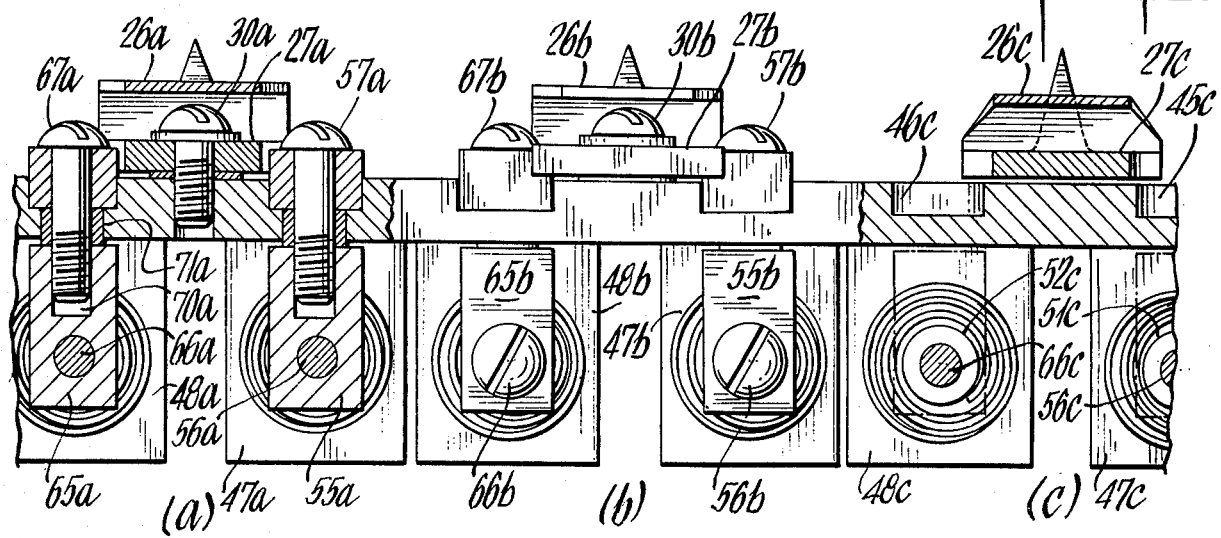

SHOCK PROOF EVENT RECORDER

BACKGROUND OF THE INVENTION

1. Field of the Invention

This invention concerns a stylus type recording instrument, in general, and more specifically it relates to an improvement of a stylus type recorder. It is especially applicable to portable recording apparatus of the type carried by a pipeline surveying pig.

2. Description of the Prior Art

In connection with data recorders, and particularly where such recorders are for use in pipeline surveying it has been found that if the recorder is subjected to high acceleration forces, there is a tendency to cause false indications. Thus, in regard to the data being recorded by the recording instrument, the shock accelerations can cause physical movement of a stylus employed by the recorder. This creates events on the record that look like genuine events which are created in response to the data being recorded.

Consequently, an object of this invention is to provide recording apparatus that has a provision for locking the recording stylus until data to be recorded is received. Thereafter, the stylus is then relocked into neutral position immediately following the recording of an event.

SUMMARY OF THE INVENTION

Briefly, the invention is in combination with an event recorder which may be subjected to high acceleration shocks during its operation. The invention comprises in combination a stylus means for indicating said event upon actuation thereof, and locking means for holding said stylus means to prevent inadvertent actuation thereof. It also comprises means for actuating said stylus means upon happening of an event, which means comprises means for concurrently unlocking and actuating said stylus means.

Again briefly, the invention is in combination with an event recorder which may be subjected to extreme positive or negative acceleration shocks during operation thereof. It comprises stylus means having a pivot for being movable from a neutral position to either of two alternatively actuated positions. The stylus means has an axis of symmetry passing through said pivot. It also comprises a pair of locking surfaces on said stylus means parallel to said axis of symmetry, and a pair of cam surfaces on said stylus means, diverging from said axis of symmetry. It also comprises a pair of rectangular blocks having cam actuator surfaces thereon, for cooperating with said cam surfaces and having flat surfaces for making sliding contact with said locking surfaces, and a pair of guides for said rectangular block to confine movement thereof in paths parallel to said axis of symmetry. It also comprises a pair of solenoids, and a pair of plungers actuated by said solenoids. Finally, it also comprises means for coupling said plungers to said rectangular blocks for alternative actuation thereof to reciprocate one of said blocks in said guide in order to unlock said stylus means and actuate it to one of said alternative positions.

Once more briefly, the invention is in combination with an instrument having a pointer. The said pointer is pivotally mounted for swinging from a neutral position to alternative event indicating positions. The invention concerns the improvement which comprises a pair of planar surfaces on said pointer located longitudinally displaced from said pivot and lying parallel to the axis of said pointer. The said pointer planar surfaces extend a predetermined longitudinal distance towards said pivot. It also comprises a pair of longitudinally shiftable stops, each having a complementary planar surface cooperating in slidable contact with one of said pointer planar surfaces. The said stop holds said pointer planar surfaces therebetween when said pointer is in said neutral position. It also comprises a pair of divergent cam surfaces on said pointer and located on the other side of said pivot from said pointer planar surfaces. Each of the said stops has a cam actuator surface thereon, located so that it will contact the corresponding one of said cam surfaces when said stop has been shifted said predetermined longitudinal distance.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 2 is an enlarged plan view, partly in cross-section, taken from underneath one of the recording units illustrated in FIG. 1;

FIG. 4 is another plan view like that of FIG. 2, but illustrating the stylus in one of it's event recording positions; and FIG. 5 is a length wise (relative to the FIG. 1 recording apparatus) end view showing a plurality of individual event recorders, as viewed at the individual cross-section indicated on FIG. 3 by the lines 5a—5a, 5b—5b and 5c—5c corresponding with the respective recording units (a), (b) and (c) of FIG. 5. These units are situated side-by-side across the width of the recording medium indicated in FIG. 1.

DESCRIPTION OF THE PREFERRED EMBODIMENT

Figure 1:
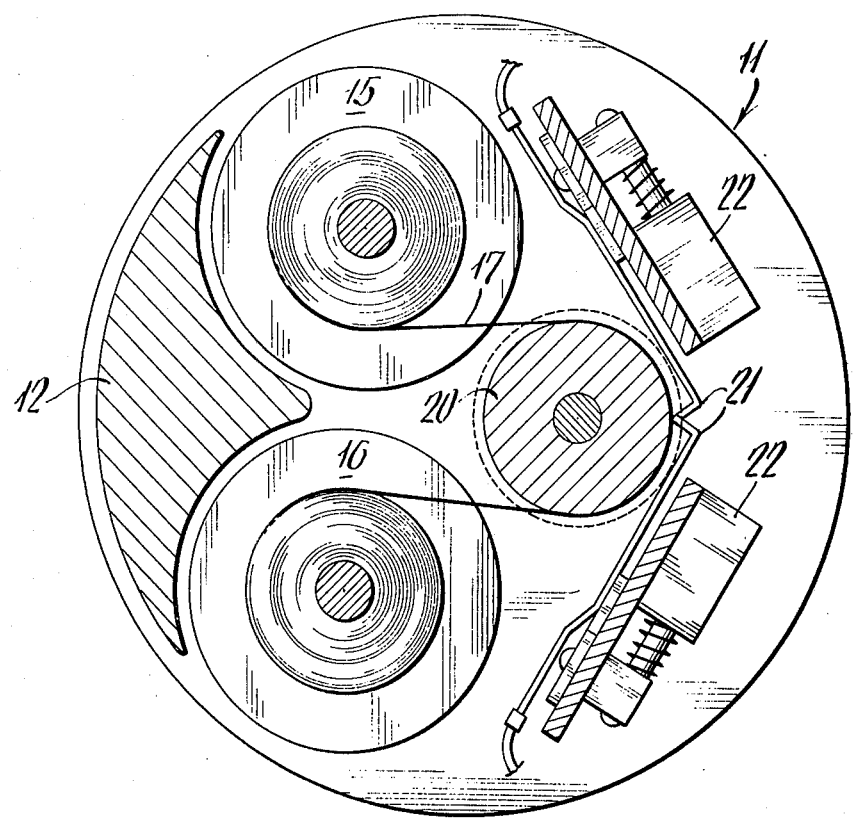
FIG. 1 is a schematic end view, partially in cross-section, of a recording apparatus incorporating stylus type event recorders according to the invention.

As generally indicated above, this invention is particularly applicable to use in portable recording apparatus, and especially such as is employed in pipeline surveying. Consequently, the recording instrument illustrated is particularly adapted to such use. Thus, FIG. 1 shows a schematic end view of a pipeline surveying instrument, or "Pig" 11 which is generally cylindrical in structure and is passed through a pipeline by means of fluid pressure as the pipeline fluid is pumped through the line.

An event recorder 12 is situated longitudinally within the instrument 11. It includes a pair of reels 15 and 16 for holding a recording medium 17. It will be appreciated that such medium might take different forms such as a paper strip that is unwound from one of the reels 15 or 16 and wound onto the other.

The strip 17 passes over a sprocket edged roller 20, in order to present the paper surface for contact by a plurality of recording pointers or styli 21. These styli 21 will make straight lines on the strip 17 in the absence of any actuation or movement of the styli 21. Of course, if there is an event to be recorded, an individual one of the styli or pointers 21 will be moved laterally relative to the strip 17 which will make an event mark on the record by diverging from the straight line being made otherwise.

Each of the styli 21 is actuated by one of a corresponding number of event recorder units 22 shown in FIG. 1. It will be appreciated that there may be two series of these event recorders 22 which are located transversely across the width of the record strip 17. This will be explained in more detail later in connection with FIG. 5.

Figure 3:
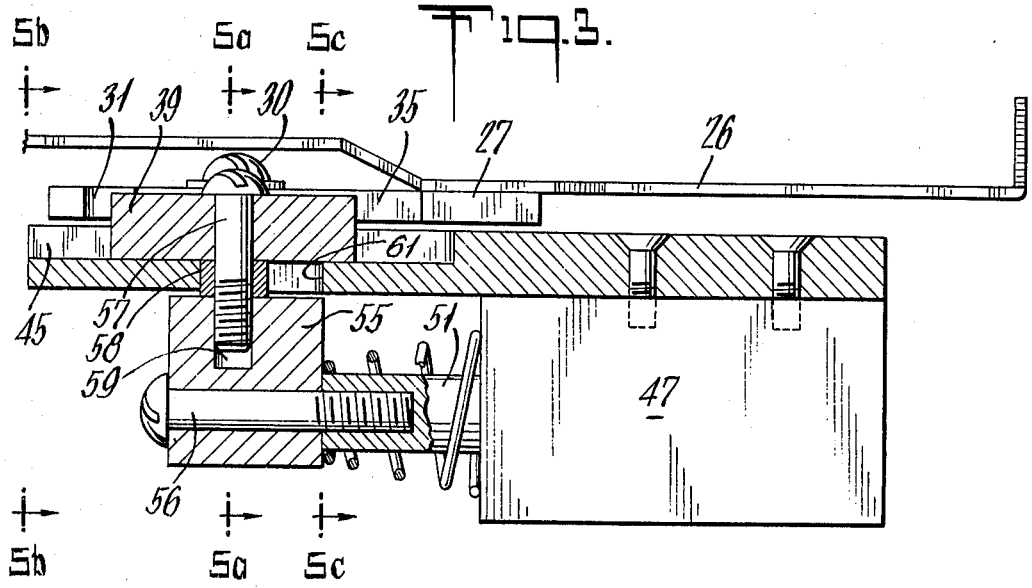
FIG. 3 is side elevation and cross-section, taken along the lines 3—3 of FIG. 2.

FIGS. 2, 3 and 4 illustrate in greater detail the elements of one of the event recorder units 22 which were indicated in FIG. 1. Thus, with reference to FIGS. 2-4, there is a stylus 26 that is mounted on a base or support member 27 which is supported for pivotal movement about a screw 30. It will be observed that the stylus or pointer 26 and it base or supporting member 27 have an axis of symmetry that passes through the center line of the pivot screw 30.

The base 27 is constructed with a pair of planar locking surfaces 31 and 32. These are parallel to the axis of symmetry of the stylus 26. Also the base 27 has a pair of cam surfaces 35 and 36 which diverge from the parallel with the axis of symmetry, in order to provide a cam action as will be explained below.

There are a pair of rectangular blocks 39 and 40 which each have a rounded edge 41 and 42 respectively. These act as cam actuator surfaces for contacting each of the cam surfaces 35 and 36 respectively.

The blocks 39 and 40 are mounted for sliding translation in grooves 45 and 46 respectively. These grooves 45 and 46 act as guides for the blocks 39 and 40 in order to confine their movements in paths that are parallel to the axis of symmetry of the stylus 26. Such sliding movement is controlled by a pair of solenoids 47 and 48 respectively that have plungers 51 and 52 respectively which are connected in any feasible manner to the respective blocks 39 and 40. For example, connected to the block 39 there is a connecting piece 55 (FIG. 3) that has a screw 56 passing therethrough to hold it onto the plunger 51. Also there is a screw 56 which goes through the block 39 and fastens into the connecting piece 55 by being screwed into a threaded hole 59. The screw 57 passes through a grommet or collar 58 that slides back and forth inside of an elongated slot 61. Similarly, the block 40 is connected by a connecting piece 65 that has a screw 66 (see FIG. 5) like corresponding screw 56 for connecting piece 55. The screw 66 holds piece 65 onto the plunger 52. A screw 67 goes through the block 40 and is screwed into a threaded hole 70 in the connecting piece 65. There is also a grommet or collar 71 that slides in an elongated slot 72.

It will be observed that the rectangular blocks 39 and 40 have flat surfaces facing the planar surfaces 31 and 32 which are on the base 27 of the stylus 26. Consequently, when the solenoids 47 and 48 are not energized and the blocks 39 and 40 are in the positions illustrated in FIG. 2, the blocks 39 and 40 will be in contact with the surfaces 31 and 32 and will hold the base of stylus 26 locked in its neutral position which is illustrated in FIG. 2.

Operation

When an event is to be recorded, there will be a signal representing the event that will energize one of the solenoids. Then, the action which takes place is indicated by the FIG. 4 illustration. This shows the parts in the positions that they take when the solenoid 47 is energized. The block 39 slides forward in the groove 45 toward the tip of the stylus 26. As the block 39 moves forward, it first unlocks the stylus 26 by having the planar surface of the block 39 slide out of contact with the planar surface 31 on the base 27. The length of block 39 is designed so that as the planar surface 31 is release from contact with the facing edge of the block 39, the other end of the block i.e. the cam actuator surface 41 will make contact with the cam surface 35 of the base 27. Then, as the block 39 continues to move forward in the groove 45 it will force the base 27 and stylus 26 to swing about the pivot 30 into an event indicating position which is illustrated in FIG. 4.

It will be appreciated that by having the symetrical arrangement, a different set of events may be recorded when the stylus 26 is moved in the opposite direction. Thus, when the other solenoid 48 is energized, the action of the stylus 26 will be reversed since the other block 40 will slide forward while the block 39 remains in its unactuated position which is illustrated in FIG. 2. Under such circumstances the stylus 26 will be swung into the opposite (event indicating) position. This is indicated by the dashed line showing in FIG. 4.

Also, it will be clear that in the neutral position, i.e. when neither of the solenoids 47 or 48 is energized, the blocks 39 and 40 will remain in the positions illustrated in FIG. 2 and the stylus 26 will be locked in this position and be held firmly against any jaring or other sudden acceleration forces.

It will be appreciated that the principles of this invention are applicable to actuation of a stylus in only one direction if desired, but by having the two actuators one on either side the separate events may be recorded to give signals in opposite directions on the record. However, it will be appreciated also that with this arrangement the signals must be in the alternative, since simultaneous signals would react again one another and cause no actuation to take place.

The surrounding structure for the individual event recorders 22 (illustrated in FIG. 1) is only schematically indicated since many different and diverse types of recording apparatus might provide the setting for a shock proof recording stylus unit according to the invention. An embodiment that is contemplated in conjunction with the FIG. 1 illustration, is one which provides for a relatively wide recording strip 17 so that there are two sets of individual event recorder units 22 running length wise across the width of strip 17 and along the axis of the total instrument 11. Thus, in FIG. 5 there is illustrated a group of such event recorders 22 situated side-by-side. In order to help clarify the structure of each such unit it may be observed that the FIG. 5 illustration shows each of the three units as being viewed along the lines 5a—5a, 5b—5b and 5c—5c all shown on the FIG. 3 illustration. These views are taken looking toward the tips of the styli 26. The various elements are provided with the same reference number as the corresponding elements of the illustrations shown in FIG. 2, 3 and 4, but with appropriate sub letters added.

It will be appreciated that a large number of different events may be recorded by including a number of the recording units along side one another across the width of the recording medium or strip 17. This is expecially so since each unit can record two distinct sets of events.

While a particular embodiment according to this invention has been described above in considerable detail, in accordance with the applicable statutes, this is not to be taken as in any way limiting the invention but merely as being descriptive thereof.

We claim:

1. In combination with an event recorder which may be subjected to high acceleration shocks during operation thereof,
   stylus means for indicating said event upon actuation thereof,
   said stylus means being pivoted to be movable from a locked position to at least one event actuated position,
   locking means for holding said stylus means to prevent inadvertent actuation thereof, and
   means for actuating said stylus means upon happening of an event, comprising
   means for concurrently unlocking and actuating said stylus means which comprises
   stop means for holding said stylus means in said locked position, and
   means for moving said stop means to release said stylus means and pivot it to said event actuated position.

2. The invention according to claim 1, wherein
   said stylus means has an axis through said pivot and comprises
   a locking surface parallel to said axis, and
   a cam surface diverging from said axis, and wherein
   said stop means comprises
   a rectangular block including a flat surface for making sliding contact with said locking surface, and
   a cam actuator for cooperating with said cam surface, and wherein
   said means for moving said stop means comprises
   a guide for said rectangular block, and
   a reciprocatable plunger for translating said block in said guide.

3. The invention according to claim 2, wherein
   said reciprocatable plunger is solenoid actuated.

4. In combination with an event recorder which may be subjected to extreme positive or negative acceleration shocks during operation thereof,
   stylus means having a pivot for being movable from a neutral position to either of two alternatively actuated positions,
   said stylus means having an axis of symmetry passing through said pivot,
   a pair of locking surfaces on said stylus means parallel to said axis of symmetry,
   a pair of cam surfaces on said stylus means diverging from said axis of symmetry,
   a pair of rectangular blocks having cam actuator surfaces thereon for cooperating with said cam surfaces and having flat surfaces for making sliding contact with said locking surfaces,
   a pair of guides for said rectangular blocks to confine movement thereof in paths parallel to said axis of symmetry,
   a pair of solenoids,
   a pair of plungers actuated by said solenoids, and
   means for coupling said plungers to said rectangular blocks for alternative actuation thereof to reciprocate one of said blocks in said guide in order to unlock said stylus means and actuate it to one of said alternative positions.

5. The invention according to claim 4, wherein
   said event recorder comprises a record medium, and a plurality of said stylus means with related elements.

6. In combination with an instrument having a pointer,
   said pointer being pivotally mounted for swinging from a neutral position to at least one event indicating position,
   the improvement comprising a planar surface on said pointer located longitudinally displaced from said pivot,
   a longitudinally shiftable stop for contacting said planar surface to hold said pointer in said neutral position, and
   means for swinging said pointer to said event position when said stop is shifted away from said neutral holding position.

7. The invention according to claim 6, wherein
   said pointer swinging means comprises
   a cam surface on said pointer, and
   a cam actuator on said stop.

8. The invention according to claim 7, wherein
   said pointer planar surface extends a predetermined longitudinal distance,
   said shiftable stop has a complementary planar surface cooperating with said pointer planar surface, and wherein
   said cam actuator contacts said cam surface when said shiftable stop has shifted said predetermined longitudinal distance.

9. In combination with an instrument having a pointer,
   said pointer being pivotally mounted for swinging from a neutral position to alternative event indicating positions,
   the improvement comprising a pair of planar surfaces on said pointer located longitudinally displaced from said pivot and lying parallel to the axis of said pointer,
   said pointer planar surfaces extending a predetermined longitudinal distance toward said pivot,
   a pair of longitudinally shiftable stops each having a complementary planar surface cooperating in slidable contact with one of said pointer planar surfaces,
   said stops holding said pointer planar surfaces therebetween when said pointer is in said neutral position,
   a pair of divergent cam surfaces on said pointer and located on the other side of said pivot from said pointer planar surfaces,
   each of said stops having a cam actuator surface thereon located so that it will contact the corresponding one of said cam surfaces when said stop has been shifted said predetermined longitudinal distance.

* * * * *